United States Patent [19]

Yates et al.

[11] Patent Number: 5,382,149
[45] Date of Patent: Jan. 17, 1995

[54] METHOD AND APPARATUS FOR PRODUCING MOLDED FOOD PIECES

[75] Inventors: Robert L. Yates, Yuba City, Calif.; Lyle Burkholder, Partridge; Greg Roepke, S. Hutchinson, both of Kans.

[73] Assignee: Sunsweet Growers, Inc., Yuba City, Calif.

[21] Appl. No.: 136,319

[22] Filed: Oct. 13, 1993

Related U.S. Application Data

[62] Division of Ser. No. 24,602, Mar. 1, 1993, Pat. No. 5,358,727.

[51] Int. Cl.⁶ .................... B29C 35/00; B29C 43/00
[52] U.S. Cl. .................... 425/237; 425/363; 425/375; 425/437; 426/512
[58] Field of Search .............. 425/96, 98, 99, 100, 425/101, 237, 335, 363, 367, 375, 408, 437; 426/512

[56] References Cited

U.S. PATENT DOCUMENTS

| | | | |
|---|---|---|---|
| 379,068 | 3/1888 | Heller et al. | 45/99 |
| 2,208,905 | 7/1940 | Kremmling et al. | |
| 2,484,670 | 10/1949 | Barker | 107/8 |
| 3,143,769 | 8/1964 | Komarek et al. | 425/237 |
| 3,635,637 | 1/1972 | Bergendahl | 425/363 |
| 3,734,659 | 5/1973 | Harris | 425/367 |
| 3,820,933 | 6/1974 | Aspin | 425/367 |
| 3,932,169 | 1/1976 | Anthony, Jr. | 75/3 |
| 4,017,241 | 4/1977 | Papinchak et al. | 425/237 |
| 4,249,878 | 2/1981 | Komarek | 425/367 |
| 4,261,692 | 4/1981 | Kuby | 425/363 |
| 4,389,178 | 6/1983 | Komarek | 425/237 |
| 5,084,296 | 1/1992 | Lugay et al. | 426/573 |
| 5,198,257 | 3/1993 | Heck et al. | 426/282 |
| 5,199,269 | 4/1993 | Andersson | 62/63 |

FOREIGN PATENT DOCUMENTS

| | | | |
|---|---|---|---|
| 213035 | 8/1955 | Australia | 425/237 |
| 1060302 | 6/1959 | Germany | 425/237 |
| 752954 | 7/1956 | United Kingdom | 425/237 |

OTHER PUBLICATIONS

Two-page brochure entitled "Freeze Wheel System," by Reno Technology (undated).

*Primary Examiner*—Charles S. Bushey

[57] ABSTRACT

Input food is extruded or otherwise deposited between a pair of counter-rotating wheels whose outer surfaces define mold cavities. The deposited input food is molded into pieces having desired shape (e.g., simulating pitted prunes or berries) by compression between aligned, counter-rotating mold cavity pairs. Preferably, the input food is heated prior to molding to prevent irreversible set up before compression between the mold cavities, and the wheels are chilled to cause deposited food to set up as it is compressed and carried between aligned, chilled mold cavities from a loading station to a release station. Preferably, the mold cavities are maintained at low temperature (e.g., in the range from about −10° F. to 32° F.). After the input food is molded and set up into pieces, the rotating cavities separate at a release station, allowing the molded pieces to fall away from the wheels. A positive product ejection assembly (such as a set of air knives) can be provided downstream from the release station for purging each cavity of its contents before refilling. The input food can be prune or other fruit paste mixed with glycerine and optionally also sorbitol (to give the molded pieces a desired water activity and humectancy), additives for providing a desired flavor and mouth feel, and mold releasing and solidifying agents.

15 Claims, 5 Drawing Sheets

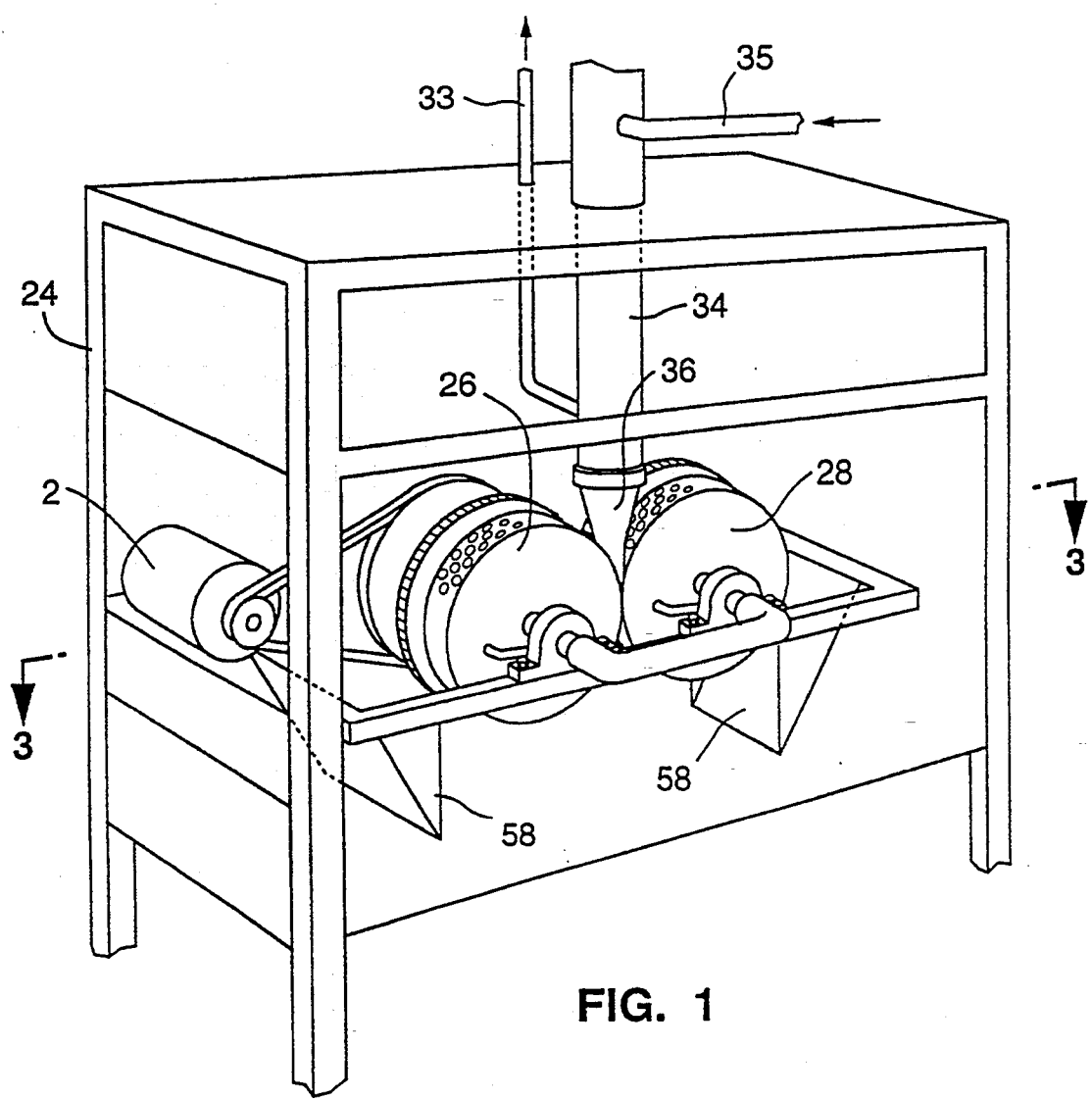
FIG. 1
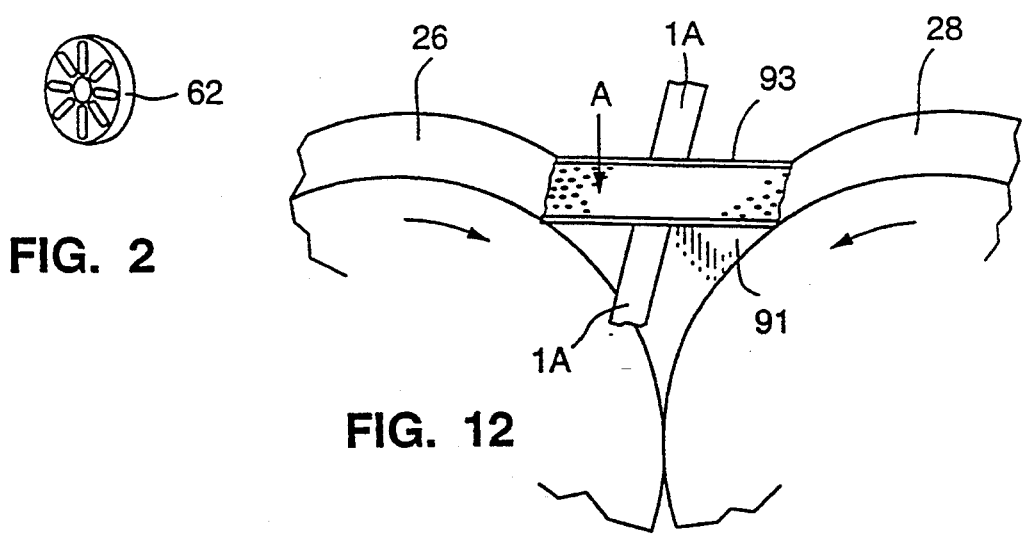
FIG. 2
FIG. 12

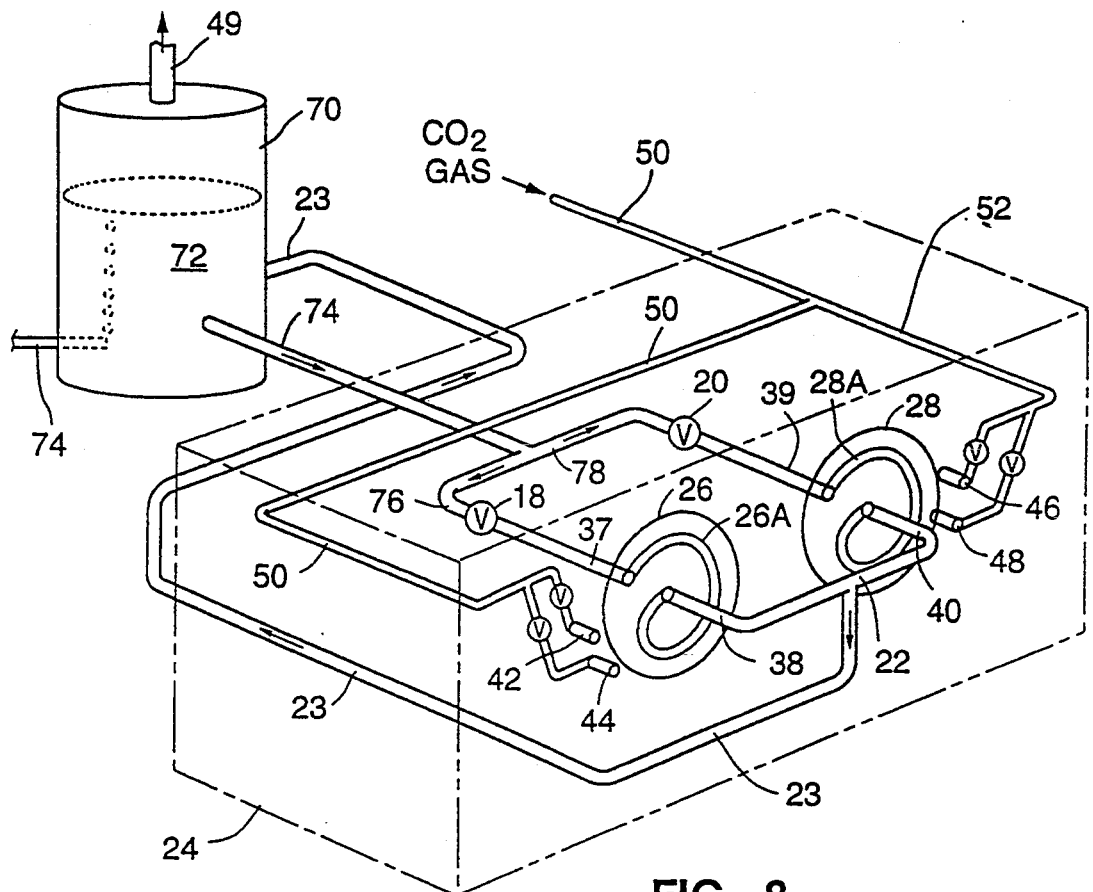
FIG. 8
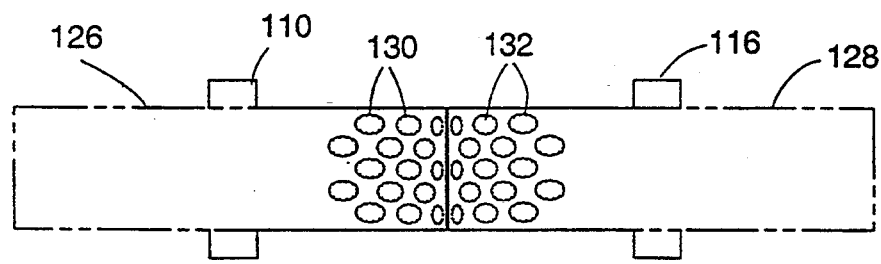
FIG. 9
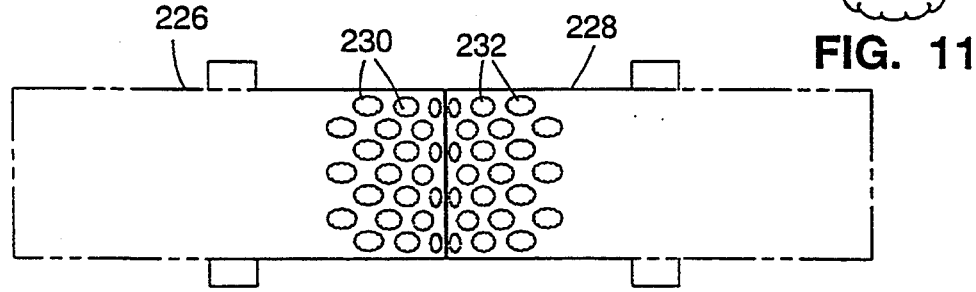
FIG. 10
FIG. 11

METHOD AND APPARATUS FOR PRODUCING MOLDED FOOD PIECES

CROSS-REFERENCE TO RELATED APPLICATION

This application is a division of pending U.S. Pat. application Ser. No. 08/024,602, filed Mar. 1, 1993, now U.S. Pat. No. 5,358,727.

FIELD OF THE INVENTION

The invention relates to an apparatus for molding food, such as prune paste or other fruit paste, into usefully shaped pieces having controlled texture and hardness, and to molded food products produced by such apparatus.

BACKGROUND OF THE INVENTION

A conventional food processing system includes a rotating wheel which contains chilled coolant fluid. Food products (such as extruded ribbons or sheets of food paste) are conveyed onto the outer surface of the wheel, and are quickly frozen or chilled as the rotating wheel carries them along a circular path portion to an unloading station.

However, until the present invention, it was not known how to efficiently mold sticky food (particularly, fruit paste) into pieces of desired size and shape, with controlled texture and hardness and achieve effective demolding of the product.

SUMMARY OF THE INVENTION

In accordance with the invention, paste-like input food, which can be fruit paste such as prune paste, is extruded between a pair of counter-rotating wheels. The outer surfaces of the wheels define mold cavities, and the extruded input food is molded into pieces having desired shape as it is pressed between aligned, counter-rotating pairs of the mold cavities. Preferably, the input food is heated prior to molding to prevent it from irreversibly setting up until after it is compressed between the mold cavities. The wheels can be chilled (such as by chilled coolant fluid flowing through channels within them), to cause the molded portions to set up (irreversibly) as they are conveyed between aligned, chilled mold cavities along a generally linear path from a loading station to a release station. In preferred embodiments, the wheels are chilled sufficiently to maintain the mold cavities at a temperature in the range from about −10° F. to about 32° F. The mold cavity temperature is 0° F. in one preferred embodiment. Alternatively, the wheels can be heated in order to set up (i.e., by heat setting or baking) food portions compressed between aligned mold cavities as such portions are conveyed by the wheels.

The input food is preferably deposited between the counter-rotating wheels at a loading station located just above the location at which the wheel surfaces touch (or very nearly touch) each other, in the form of an extruded sheet. Portions of the input food sheet are compressed between counter-rotating mold cavity pairs as the wheels carry them past the loading station.

After the input food is deposited and compressed, the rotating cavities separate at a release location (release station), allowing the molded pieces to fall away from the wheels. Because some molded pieces may remain stuck to one of the wheels, positive product ejection means (which can be a set of one or more air knives) should be provided downstream from the release station (along the circular path traversed by each mold cavity) for purging each mold cavity of its contents prior to refilling with new, unmolded deposits of input food.

To ensure that all molded pieces will be ejected from the mold cavities before the cavities are refilled, it is sometimes desirable to mist the empty cavities during each revolution of each wheel, with a non-toxic lubricant such as glycerine, to reduce adhesion between the molded pieces and the mold cavities. For example, nozzles which emit glycerine mist can be positioned for lubricating the mold cavities before they are filled and refilled. Alternatively (or additionally), mold release additives can be mixed with the input food before it is deposited between the wheels to reduce adhesion between molded pieces and the mold cavities after molding.

In a class of preferred embodiments, the input food is a fruit paste mixed with additives, comprising (by weight) 60% prune paste (having about 25% water content) and 15–16% glycerine. The function of the glycerine is to control water activity to give the molded pieces a soft and pliant texture. Optionally, sorbitol is included in the mixture in an amount experimentally determined to produce a desired water activity and humectancy of the molded product. To adjust the sugar to acid ratio, the mixture should include (by weight) 13% fructose, 3% sucrose, 0.12% citric acid (and tartaric acid, plum essence, and appropriate flavoring in small amounts experimentally determined to produce a desired molded product flavor). To reduce bulk density and give the molded product a less gummy mouth feel, the mixture should include 1.25% citrus fiber and 2.45% oat fiber. The mixture also preferably includes a mold releasing agent (which can be Alpha-dim 90 or BFP-65K) in an amount of about 1% by weight to reduce adhesion between the molded pieces and the mold cavities, and a solidifying agent such as Manugel-C in an amount of about 0.4% by weight.

Molded pieces produced in accordance with the inventive method (such as pieces having the composition described in the previous paragraph) are within the scope of the invention.

The inventive mold cavities employed are desirably shaped so that the molded pieces of prune paste have shapes simulating pitted prunes or berries.

In preferred embodiments, unmolded prune paste is maintained in a heated hopper at a temperature in the range from about 180° F. to 212° F. prior to molding. The hopper is heated with low grade heat and has high residual capacity (it can be identical or similar to a double boiler) to prevent exposure of the paste to excessively high heat from the surface of the hopper.

BRIEF DESCRIPTION OF THE DRAWINGS

FIG. 1 is a perspective view of a preferred embodiment of the apparatus of the invention.

FIG. 2 is a perspective view of a molded food piece produced by the FIG. 1 apparatus.

FIG. 8 is a schematic diagram of the fluid flow components of the FIG. 1 apparatus, including a fluid cooling tank not shown in FIG. 1.

FIG. 9 is a top elevational view of a pair of counter-rotating wheels employed in a second preferred embodiment of the invention.

FIG. 10 is a top elevational view of a pair of counter-rotating wheels employed in a second preferred embodiment of the invention.

FIG. 11 is a perspective view of a berry-shaped molded food piece produced by the apparatus of FIG. 9 or FIG. 10.

FIG. 12 is a perspective view of a detail of a variation of the apparatus of FIG. 4.

DETAILED DESCRIPTION OF THE PREFERRED EMBODIMENT

A first preferred embodiment of the apparatus of the invention will be described with reference to FIGS. 1 through 8. Although this embodiment can be employed to mold prune paste (with additives as described below) into food pieces which resemble pitted prunes, such as piece 62 shown in FIG. 2, it can also be employed to mold other food products.

Figure 3:
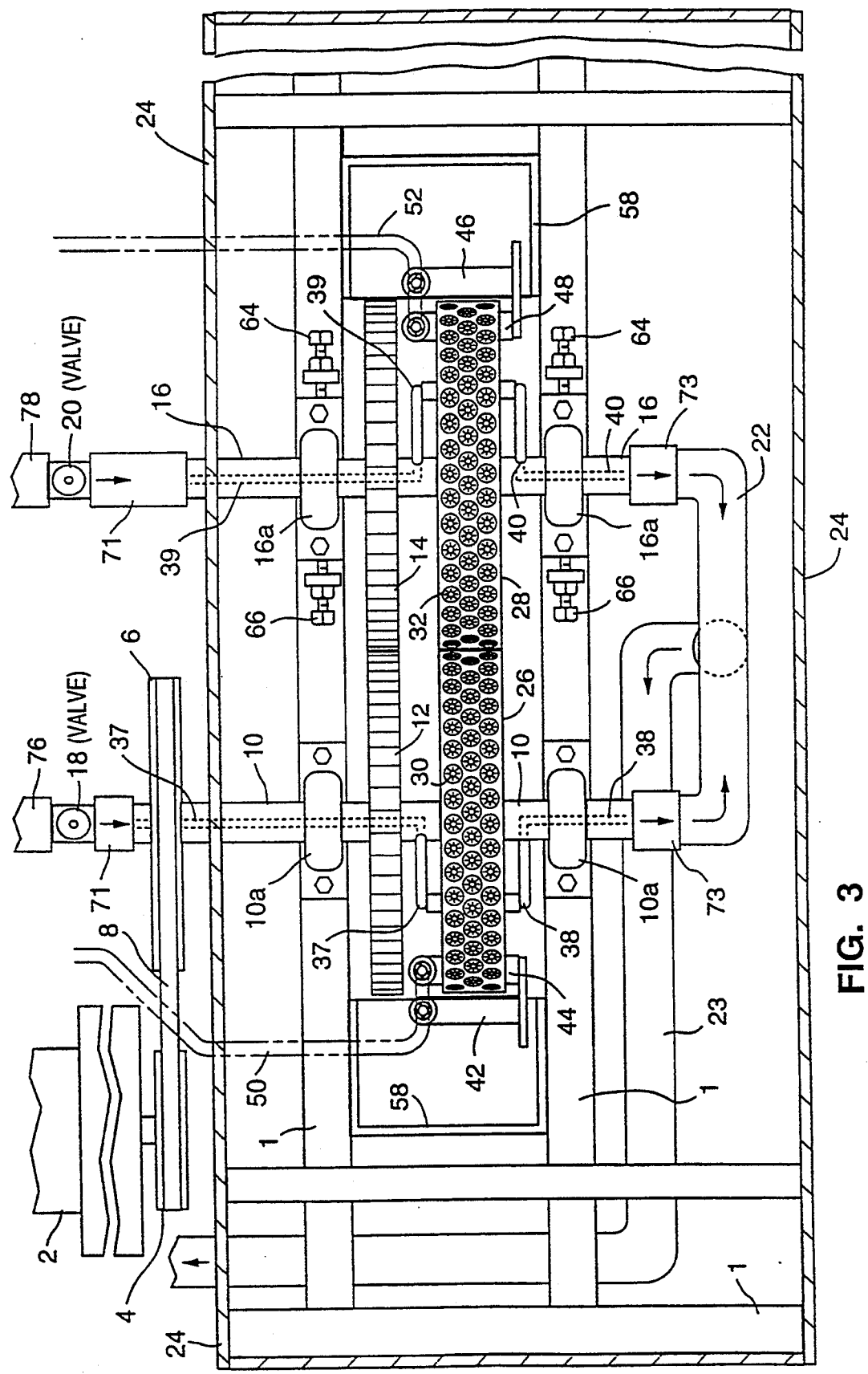
FIG. 3 is a cross-sectional view of the FIG. 1 apparatus, taken along line 3—3 of FIG. 1.
Figure 4:
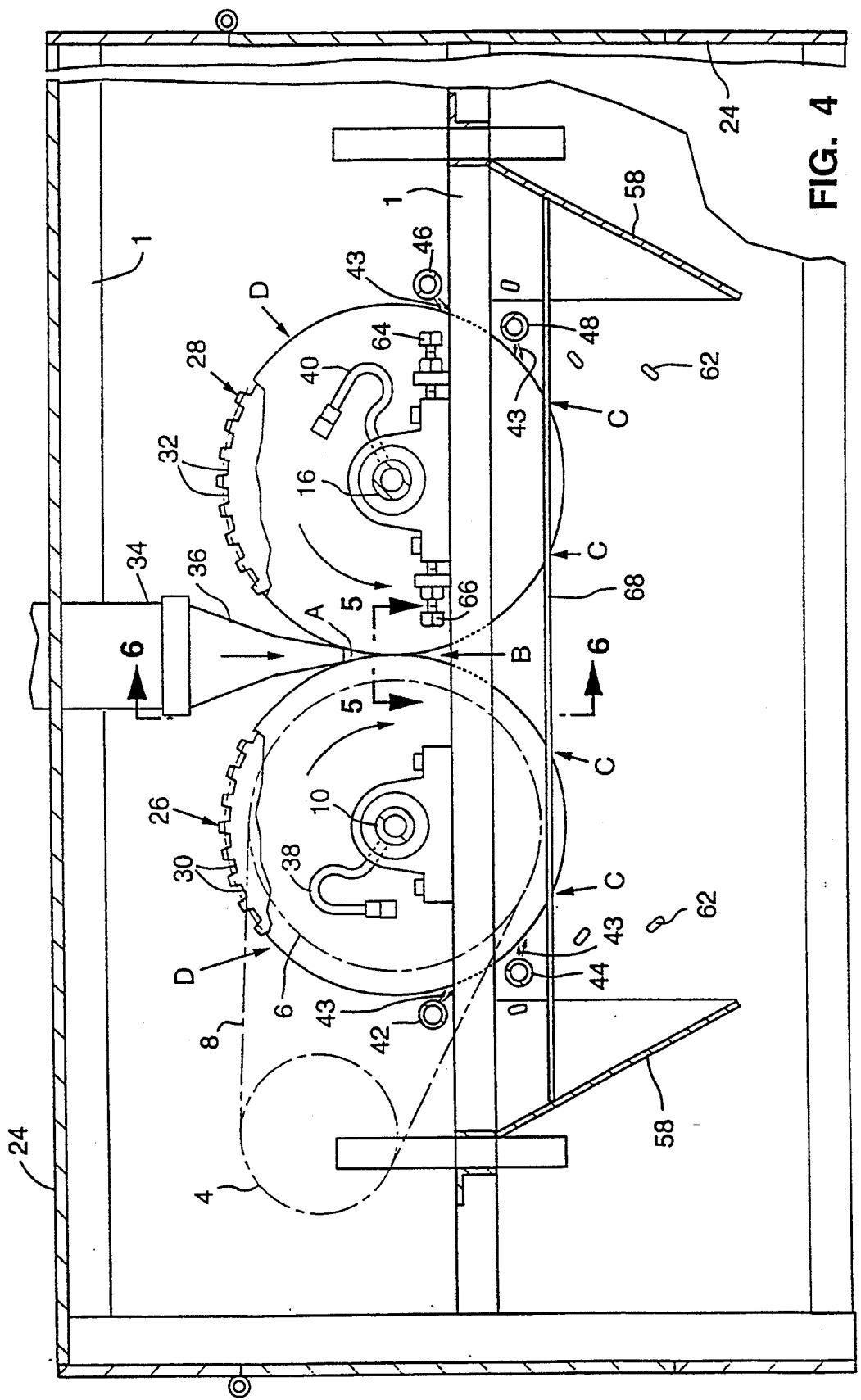
FIG. 4 is a cross-sectional view of the FIG. 1 apparatus, in a vertical plane.

As shown in FIGS. 1, 3, and 4, the apparatus includes counter-rotating wheels 26 and 28. Wheel 26 is fixedly attached around shaft 10 and wheel 28 is fixedly attached around shaft 16. Shaft 10 extends through bearings 10a attached to frame 1, so that shaft 10 is free to rotate within bearings 10a relative to frame 1, and shaft 16 extends through bearings 16a attached to frame 1, so that shaft 16 is free to rotate within bearings 16a relative to frame 1.

Figure 5:
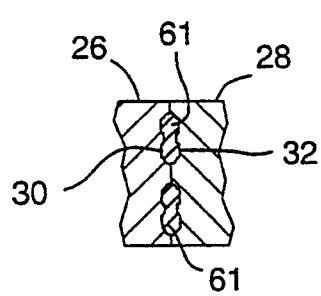
FIG. 5 is a cross-sectional view of a portion of the FIG. 4 apparatus, taken along line 5—5 of FIG. 4.

The outer surface of wheel 26 defines a see of mold cavities 30, and the outer surface of wheel 28 defines a set of corresponding mold cavities 32. Input food 61 (shown in FIGS. 5 and 6) preferably has a homogeneous, soft, paste-like consistency, and is extruded out from extruder nozzle 36 into the region between wheels 26 and 28 (at a loading station "A" shown in FIGS. 4 and 6). Wheels 26 and 28 are driven so that each cavity 30 is always aligned with a corresponding cavity 32 at the intersection of wheels 26 and 28. Rotating wheel 28 is biased against counter-rotating wheel 26, so that the apparatus molds input food 61 into specially shaped individual pieces (such as piece 62 shown in FIG. 2) as food 61 is compressed within the volume enclosed by each aligned pair of cavities 30 and 32 (as shown in FIG. 5).

Figure 6:
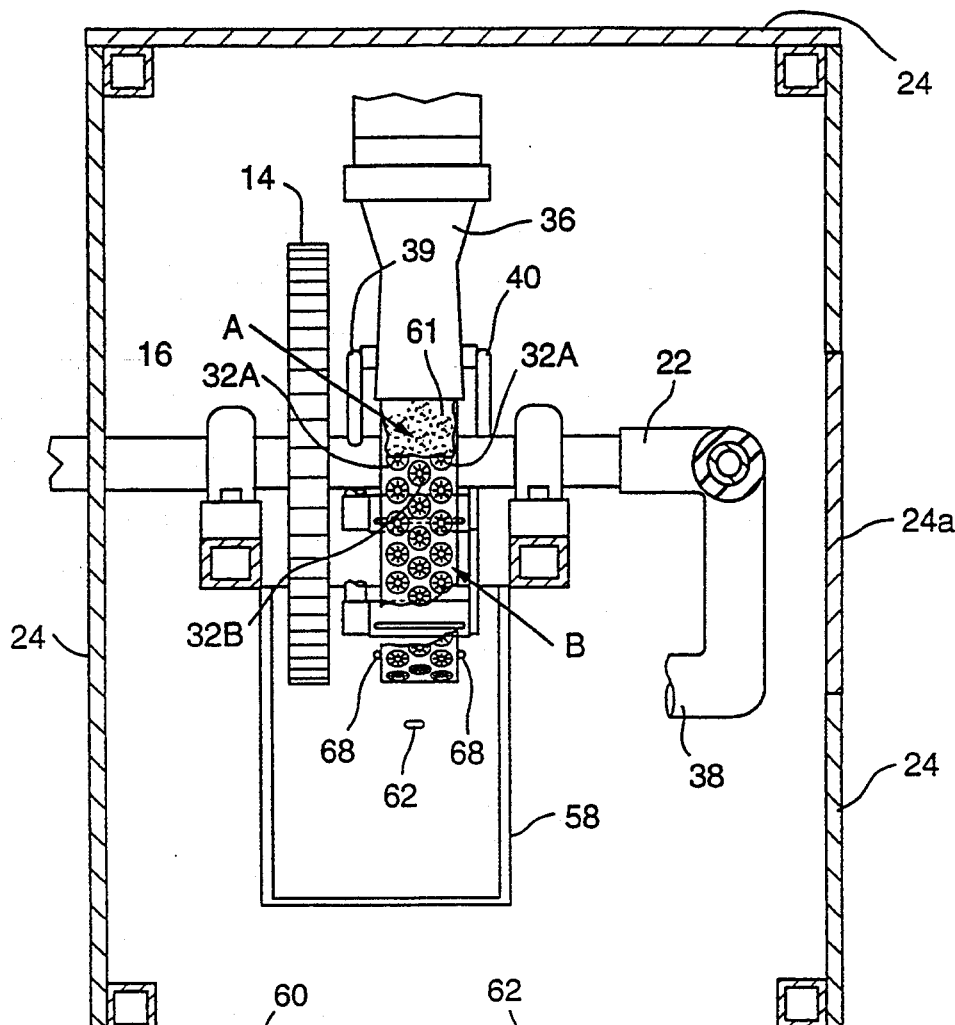
FIG. 6 is an elevational view of a portion of the FIG. 4 apparatus, from the plane defined by line 6—6 of FIG. 4.

As shown in FIGS. 3 and 6, mold cavities 30 and 32 are arranged in very closely packed fashion on the outer surface of wheels 26 and 28. There are three staggered rows of mold cavities around each wheel, with an alternating pattern of two cavities (e.g., cavities 32A of FIG. 6) and one cavity (e.g., cavity 32B of FIG. 6) across the width of the wheel.

Rotatable shaft 10 is mounted to frame 1 with its rotational axis (aligned vertically in FIG. 3) fixed relative to frame 1, and rotatable shaft 16 is mounted to frame 1 with its rotational axis (aligned vertically in FIG. 3) having a limited range of motion relative to frame 1. Two pairs of adjustment screws 64 and 66 mounted to frame 1 are provided for adjusting the position of shaft 16 (and bearings 16a through which it extends) relative to frame 1, so as to bias wheel 28 against wheel 26. By retracting screws 66 (to the left in FIG. 3) while advancing screws 64 (to the left in FIG. 3), shaft 16 can be displaced toward shaft 10 until rotating wheel 28 is biased against counter-rotating wheel 26 with sufficient force to mold input food 61 into individual pieces 62 as the food is compressed between aligned mold cavities and is carried by the aligned mold cavities from a loading station (e.g., location "A" in FIGS. 4 and 6) to a "release" station (e.g., location "B" in FIGS. 4 and 6). In alternative preferred embodiments, adjustable screw assemblies 64 and 66 are replaced by a means for spring-loading shaft 16 toward shaft 10 with wheel 28 in direct contact with wheel 26, and with wheel 28 exerting sufficient biasing force to mold input food 61 into individual pieces 62 as the food is compressed between aligned mold cavities and is carried thereby from the loading station (e.g., location "A" in FIG. 4) to the "release" station (e.g., location "B" in FIG. 4).

Typically, the diameter of each of wheels 26 and 28 is about ten inches, and the outer surfaces of wheels 26 and 28 (defining mold cavities 30 and 32) are made of stainless steel (preferably, of the type known as "304" stainless steel). Each wheel 26 and 28 is manufactured with mold cavities (30 or 32) of desired shape formed (such as by a machining or casting operation) in its outer cylindrical surface.

Gear 12 is fixedly attached to shaft 10, and gear 14 is fixedly attached to shaft 16 so that the teeth of gear 14 intermesh with the teeth of gear 12. Wheel 6 is fixedly attached to shaft 10. Wheel 4 is rotated by motor 2. Drive belt 8 is looped around wheels 4 and 6, so that rotating wheel 4 causes belt 8 to rotate wheel 6, shaft 10, gear 12, and wheel 26 as a unit. As gear 12 rotates clockwise (causing wheel 26 to rotate clockwise, as shown in FIG. 4), gear 12 forces gear 14, shaft 16, and wheel 28 to rotate as a unit in a counterclockwise direction (as indicated in FIG. 4).

Motor 2 is preferably of a type which can be controlled to drive counter-rotating wheels 26 and 28 at precisely selectable, variable rotational speeds.

Many of molded pieces 62 drop directly onto conveyor belt 60 (shown in FIG. 6 but not FIGS. 3 and 4) when counter-rotating wheels 26 and 28 carry them to release station B (shown in FIG. 4) below loading station A. However, some pieces may cling to cavity 30 or cavity 32 even after reaching location B, although the mold cavities in which such pieces were formed will have separated from each another by that point. Any such pieces 62 that cling to one of cavities 30 and 32 as counter-rotating wheels 26 and 28 continue to carry them, will be ejected by high pressure gas streams 43 emitted from air knives 42 (also referred to as gas knives), 44, 46, and 48. Conveyor belt 60 receives pieces 62 that are ejected from wheels 26 and 28 by air knives 42, 44, 46, and 48 (and those that fall downward at release location B). Each of the air knives is fixedly mounted to frame 1.

Front and back panels 58 are mounted on frame 1 in positions to catch pieces 62 that have been blown off wheels 26 and 28 by gas streams 43, and to direct these pieces downward toward conveyor 60.

To ensure that all molded pieces 62 will be ejected from the mold cavities before the cavities are refilled, it may be desirable to mist the empty cavities during each revolution of each wheel with a non-toxic lubricant such as glycerine, to reduce adhesion between the molded pieces 62 and the mold cavities. For example, nozzles which emit glycerine mist can be positioned at locations "D" shown in FIG. 4 to lubricate the mold cavities before they are filled and refilled. Alternatively (or additionally), "mold release" additives (to be discussed below) can be mixed with input food 61 before it is deposited between wheels 26 and 28 to reduce adhesion between molded pieces 62 and mold cavities 30 and 32.

Two wires 68 (shown in FIGS. 4 and 6) can be stretched between panels 58 on opposite sides of wheels 26 and 28. Each of wires 68 cuts off excess food from edges of counter-rotating wheels 26 and 28 at its points of intersection with the outer edges of the wheels (e.g., at locations C shown in FIG. 4).

In addition to wires 68 (or as a substitute therefor), cheek plates (such as cheek plates 91 and 93 shown in FIG. 12) are preferably mounted between wheels 26 and 28 around the loading station to prevent input food 61 from escaping from the loading station except by being compressed between a pair of aligned mold cavities. As shown in FIG. 12, cheek plate 91 and cheek plate 93 are fixedly mounted to rigid portions 1A of frame 1 in positions so that the outer surfaces of wheels 26 and 28 ride directly on plates 91 and 93 (and so that plates 91 and 93 and wheels 26 and 28 surround loading station A). As wheels 26 and 28 counter-rotate in the directions shown in FIG. 12, the edges of the wheels' outer surfaces slide relative to plates 91 and 93. To minimize the friction between plates 91 and 93 and wheels 26 and 28, plates 91 and 93 are preferably made of Teflon material, or some other highly lubricated or low-friction material.

In a variation on the FIG. 12 apparatus, a pair of small, counter-rotating wheels can be employed in place of cheek plates 91 and 93. Such small wheels should be oriented with parallel rotational axes, with these rotational axes oriented perpendicular to shafts 10 and 16. The small wheels should roll directly against the sides of wheels 26 and 28, to prevent excess food 61 from escaping from the loading station except by being compressed between a pair of aligned mold cavities of wheels 26 and 28.

Heated hopper 34 is preferably double walled, and heated water is pumped through the space between its walls to maintain input food 61 (within the inner wall) at a selected temperature in the range from about 120° F. to 212° F. (and preferably from about 180° F. to 212° F.), without exposing food 61 (and especially the portion of food 61 in direct contact with the inner wall of hopper 34) to excessively high heat. Hot water intake line 35 (shown in FIG. 1) supplies heated water to the space between hopper 34's walls, and outlet line 33 (shown in FIG. 1) removes water from such space following heat transfer from the water to food 61.

The purpose of heating food 61 (in preferred embodiments) before depositing it between wheels 26 and 28 is to prevent it from irreversibly solidifying ("setting up") so that it can be mixed and extruded. As will be explained below, this is particularly important in cases where food 61 is prune paste, apricot paste, or another fruit paste. In preferred embodiments, wheels 26 and 28 are cooled to cause each food piece being compressed between cavities 30 and 32 to set up rapidly. In alternative embodiments it may be unnecessary to heat food 61 prior to molding, and it may be desirable to heat rather than cool wheels 26 and 28. An example of the latter embodiment is one in which input food 61 is a batter that is rapidly baked (or partially baked) as it is molded into pieces 62 between heated cavities 30 and 32.

Any of a variety of mechanisms for extruding or otherwise depositing input food product 61 between wheels 26 and 28 can be employed in alternative embodiments of the invention. Preferably, input food 61 is deposited in the form of a sheet which is compressed between the counter-rotating wheels at a point where the wheels' outer surfaces touch (or very nearly touch) each other. Alternatively, the inventive apparatus can include a depositing means which cleanly and accurately meters and deposits precise volumes of input food 61 into the rotating mold cavities at precisely correct times to prevent smearing or over-filling. For example, extruder nozzle 36 of FIGS. 4 and 6 could be preferably sized, shaped, and driven in pulsed fashion to deliver a sheet of food 61 having periodically varying width between wheels 26 and 28, with the sheet having greater width at times when simultaneously received by two pairs of mold cavities 30 and 32 (e.g., cavities 32A of FIG. 6 and corresponding cavities 30), and narrower width at times when received by a single pair of mold cavities 30 and 32 (e.g., cavity 32A of FIG. 6 and the corresponding cavity 30). Some such alternative embodiments of the depositing means may desirably be capable of consistently depositing correct amounts of input food to prevent fouling of the molds and wheels, and to eliminate production of feather-edged pieces.

Fluid channel 26A (shown in FIG. 8) extends through wheel 26 and fluid channel 28A (shown in FIG. 8) extends through wheel 28, so that heated or chilled fluid can be pumped through the wheels to heat or cool cavities 30 and 32. In the preferred embodiment of FIGS. 1-8, chilled coolant fluid (preferably, a commercially available orange peel oil product known as "D-Limonene" fluid) is pumped through channels 26A and 28A to maintain mold cavities 30 and 32 at a temperature in the range from about $-10°$ F. to about 32° F., in order to set up each molded piece 62 irreversibly as the piece is carried by wheels 26 and 28 along a generally linear path from the loading station to the release station at which it falls off both wheels (or at which it falls off one of the wheels, and is then carried by a second one of the wheels along a portion of a circular path until it is blown off the second wheel by one of air knives 42, 44, 46, and 48).

To prevent ambient water vapor from freezing on the chilled mold cavities 30 and 32, wheels 26 and 28 are maintained in a dry carbon dioxide environment during operation of the inventive apparatus. To achieve this purpose, enclosure 24 (which can be made of transparent plastic) surrounding wheels 26 and 28 is supplied with dry carbon dioxide gas at pressure greater than atmospheric pressure (for example, from air knives 42, 44, 46, and 48), to displace ambient air and thus prevent ambient air (with water vapor) from reaching mold cavities 30 and 32. Enclosure 24 can have an open bottom (as shown in FIG. 6) to allow the finished pieces 62 to fall onto conveyor 60 (shown in FIG. 6) and allow excess carbon dioxide gas to escape. Enclosure 24 preferably has hinged doors 24a (such as those shown in FIGS. 4 and 6) which can be opened to permit access to the mechanical components within enclosure 24.

As best shown in FIG. 8, chilled coolant fluid 72 is pumped from tank 70 through line 74, and then through lines 76 and 78 to valves 18 and 20, respectively. If valve 18 is open, fluid 72 flows through valve 18 into line 37, through line 37 into channel 26A within wheel 26, and then out from channel 26A to line 38. If valve 20 is open, fluid 72 flows through valve 20 into line 39, through line 39 into channel 28A within wheel 28, and then out from channel 28A to line 40. Line 37 extends through shaft 10 (as shown by the dashed line in FIG. 3) until just before it connects with channel 26A, and line 38 extends through shaft 10 (except for its inlet end portion, shown in FIG. 3, connected to the outlet of channel 26A). Similarly, line 39 extends through shaft 16 (as shown by the dashed line in FIG. 3) until just before it connects with channel 28A, and line 40 extends through shaft 16 (except for its inlet end portion, shown in FIG. 3, connected to the outlet of channel 28A). Fluid 72 flows from the outlet ends of lines 38 and 40 into connector 22, from connector 22 into line 23, and through line 23 back to tank 70.

As shown in FIG. 3, rotary union 71 couples non-rotating valve 18 and fluid line 76 to rotating shaft 10, and another rotary union 71 couples non-rotating valve 20 and fluid line 78 to rotating shaft 16. Coolant fluid can flow from line 76 through valve 18 and union 71 into line 37 within shaft 10, and coolant fluid can flow from line 78 through valve 20 and union 71 into line 39 within shaft 16. Similarly, rotary union 73 couples non-rotating connector 22 to an end of rotating shaft 10, and another rotary union 73 couples non-rotating connector 22 to an end of rotating shaft 16.

Liquid carbon dioxide is supplied to tank 70 from inlet line 74. The carbon dioxide chills fluid 72 within tank 70 as follows: the liquid carbon dioxide transforms into gaseous carbon dioxide on contact with fluid 72, and the carbon dioxide gas bubbles up through the fluid 72 (as indicated in FIG. 8). The carbon dioxide gas then escapes from the rod of tank 70 through line 49.

Pressurized carbon dioxide gas is supplied through gas line 50 to air knives 42 and 44 within enclosure 24, and from line 50 through gas line 52 to air knives 46 and 48 within enclosure 24.

Figure 7:
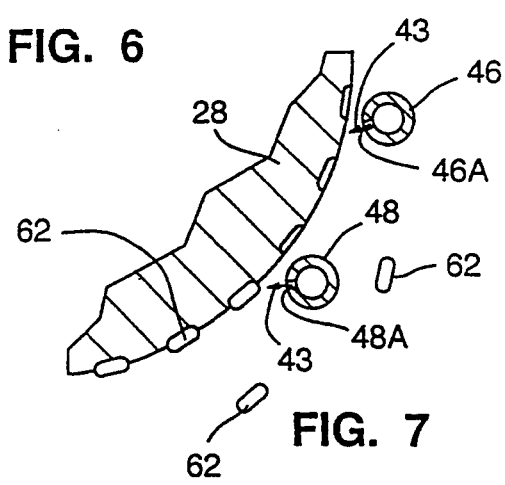
FIG. 7 is a side cross-sectional view of the air knife portion of the FIG. 4 apparatus.

Each of air knives 42, 44, 46, and 48 includes a slit (or set of holes) which directs a stream 43 of pressurized carbon dioxide gas onto the adjacent wheel. Examples of such slits are slit 46A through the sidewall of generally cylindrical air knife 46, and slit 48A through the sidewall of generally cylindrical air knife 48, as shown in FIG. 7.

A second preferred embodiment of the apparatus of the invention will be described with reference to FIG. 9. This second embodiment is identical to the above-described first embodiment, except that its mold cavities 130 and 132 are differently shaped than mold cavities 30 and 32 of the first embodiment. The second embodiment molds the input food paste (preferably prune paste with additives as described below) to produce berry-shaped food pieces, such as piece 162 shown in FIG. 11. As shown in FIG. 9, cavities 130 and 131 are slightly elongated, and oriented with their long axes perpendicular to parallel shafts 110 and 116, around which wheels 126 and 128 respectively rotate. In the FIG. 9 embodiment, there are five staggered rows of mold cavities around each wheel, with an alternating pattern of three cavities and two cavities across the width of the wheel.

A third preferred embodiment of the apparatus of the invention will be described with reference to FIG. 10. This third embodiment is identical to the above-described second embodiment, except that its counter-rotating wheels 226 and 228 are wider than corresponding wheels 126 and 128, and in that there are more mold cavities 230 and 232 arranged across the width of each of wheels 226 and 228. The third embodiment molds an input food paste (preferably prune paste with additives as described below) to produce berry-shaped food pieces identical to those of the FIG. 10 embodiment. In the FIG. 10 embodiment, there are seven staggered rows of mold cavities around each wheel, with an alternating pattern of four cavities and three cavities across the width of the wheel.

It is contemplated that in various embodiments of the invention, the counter-rotating wheels can have any of a variety of widths. For example, the wheels can have a width of 1.5 inches or less in some embodiments, and in other embodiments the wheels can have width in the range from about seven inches to about twenty inches or more.

In preferred embodiments, the inventive method includes the steps of heating a fruit paste (such as prune paste) to prevent the paste from irreversibly setting up before molding, extruding the heated paste into a sheet, and molding the sheet into portions having desired shape by pressing the paste between counter-rotating wheels. Typically, the wheels are chilled (such as by chilled coolant fluid flowing through channels within the wheels), and the molded portions are set up (irreversibly) as they are conveyed between aligned mold cavities of the chilled wheels from a loading station to a release station. Typically, the wheels are chilled sufficiently to maintain the mold cavities at a temperature in the range from about $-10°$ F. to about 32° F. (the mold cavity temperature is 0° F. in one preferred embodiment). Alternatively, the wheels can be heated in order to set up (i.e., by baking) the food portions compressed between aligned mold cavities thereof as such portions are conveyed by the wheels from a loading station to a release station.

In preferred embodiments, unmolded prune paste is maintained in a heated hopper at a temperature in the range from about 180° F. to 212° F. prior to molding. The hopper is heated with low grade heat and has high residual capacity (it can be identical or similar to a double boiler) to prevent exposure of the paste to excessively high heat from the surface of the hopper.

The input food paste is preferably deposited at a loading station in the form of a sheet, in a manner so that the sheet is compressed between counter-rotating wheels (with portions of the paste between aligned mold cavity pairs).

After the input paste is deposited and compressed, the rotating cavities separate at a "release" location (or station), allowing the molded pieces to fall away from the wheels. Because some pieces may remain stuck to one of the wheels, positive product ejection means (which can be a set of one or more air knives) should be provided downstream from the release station for purging each mold cavity of its contents prior to refilling with new, unmolded deposits of paste.

To ensure that all molded pieces will be ejected from the mold cavities before the cavities are refilled, it may be desirable to mist the empty cavities during each revolution of each wheel, with a non-toxic lubricant such as glycerine, to reduce adhesion between the molded pieces and the mold cavities. For example, nozzles which emit glycerine mist can be positioned for lubricating the mold cavities before they are filled and refilled. Alternatively (or additionally), "mold release" additives can be mixed with the input food paste before it is deposited between the wheels to reduce adhesion between molded pieces and the mold cavities after molding.

In a class of preferred embodiments, the input food is a fruit paste mixed with additives, comprising (by weight) 60% prune paste (the prune paste should have about 25% water content) and 15–16% glycerine. The function of the glycerine is to control water activity to give the molded pieces a soft and pliant texture. Optionally, sorbitol is included in the mixture in an amount experimentally determined to give the molded product a desired water activity and humectancy. To enhance flavor expression, the mixture should include (by weight) 13% fructose, 3% sucrose, 0.12% citric acid (and tartaric acid, plum essence, and almond flavoring in small amounts experimentally determined to produce a desired molded product flavor). To reduce bulk density and give the molded product a less "gummy" mouth feel, the mixture should include 1.25% citrus fiber and 2.45% oat fiber. Manugel-C, a solidifying agent available from Kelco Division of Merck & Co., Inc. (or an equivalent solidifying agent) is preferably included in an amount 0.4% by weight. A mold releasing agent (lubricant), such as Alpha-dim 90 (available from American Industries) or BFP-65K (also available from American Industries), is preferably also included in an amount of about 1% by weight to reduce adhesion between the molded pieces and the mold cavities.

The mold cavities are desirably shaped so that the molded pieces of prune paste have shape simulating pitted prunes (like piece 62 shown in FIG. 2), or berries (like piece 162 shown in FIG. 11).

Various modifications and alterations in the described method and apparatus of the invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A food paste molding apparatus, including:
a frame;
a first wheel rotatably mounted to the frame, having an outer surface defining a first set of mold cavities;
a second wheel rotatably mounted to the frame, wherein the second wheel has an outer surface defining a second set of mold cavities, and wherein the outer surface of the second wheel faces the outer surface of the first wheel at a loading station;
means for rotating the first wheel and counter-rotating the second wheel so that each of the mold cavities in the first set rotates into alignment with one of the mold cavities in the second set at the loading station, and so that each pair of aligned mold cavities travels along a path from the loading station to a release station, wherein the aligned mold cavities separate at said release station, wherein a first channel extends through the first wheel and a second channel extends through the second wheel;
chilled coolant fluid in the first channel and the second channel, said fluid having a temperature that maintains the mold cavities at a cavity temperature, in a range from about $-10°$ F. to $32°$ F., and sufficient to cause portions of food paste to into pieces as said portions are carried between said each pair of aligned mold cavities from the loading station to the release station; and
cooling means for flowing the chilled coolant fluid through the first channel and the second channel so as to maintain the mold cavities at said cavity temperature.

2. The apparatus of claim 1, also including:
food depositing means for depositing an input food between the first wheel and the second wheel at the loading station.

3. The apparatus of claim 2, wherein the food depositing means comprises:
a hopper for storing the input food;
means for heating the hopper to maintain the input food at a temperature sufficiently high to prevent the input food from setting up irreversibly; and
an extrusion nozzle for receiving input food from the hopper and extruding a sheet of the input food between the first wheel and the second wheel at the loading station.

4. The apparatus of claim 1, also including:
a first shaft fixedly attached to the first wheel;
a means for rotatably mounting the first shaft to the frame;
a second shaft fixedly attached to the second wheel;
a means for rotatably mounting the second shaft to the frame;
a first fluid line, a portion of which extends through the first shaft, having an outlet end connected to an inlet of the first channel, for supplying a first portion of the chilled coolant fluid to the first channel; and
a second fluid line, a portion of which extends through the second shaft, having an outlet end connected to an inlet of the second channel, for supplying a second portion of the chilled coolant fluid to the second channel.

5. The apparatus of claim 4, also including:
a coolant fluid tank; and
a return fluid line having inlet ends connected to outlets of first channel and the second channel, and having an outlet end connected to the coolant fluid tank, to enable the coolant fluid to flow from the first channel and the second channel back to the coolant fluid tank,
wherein the first fluid line and the second fluid line have inlet ends connected to the coolant fluid tank, to enable the chilled coolant fluid to flow into the first fluid line and the second fluid line from the coolant fluid tank.

6. The apparatus of claim 1, also including:
an enclosure surrounding the first wheel and the second wheel; and
carbon dioxide supply means for maintaining dry carbon dioxide gas at pressure greater than atmospheric pressure within the enclosure, to displace ambient air and water vapor thereby preventing the ambient air and water vapor from reaching the mold cavities.

7. The apparatus of claim 6, wherein the carbon dioxide supply means includes a set of gas knives which direct carbon dioxide gas toward at least one of the first wheel and the second wheel.

8. The apparatus of claim 1, also including:
first product ejection means mounted at an ejection station adjacent to the outer surface of the first wheel for purging the mold cavities in the first set of their contents as they translate past the ejection station.

9. The apparatus of claim 8, wherein the first product ejection means includes a set of gas knives.

10. The apparatus of claim 9, also including:
means for supplying carbon dioxide gas to the gas knives at sufficient pressure so that each gas knife in the set of gas knives directs a stream of said carbon dioxide gas onto the first wheel.

11. The apparatus of claim 10, also including:
second product ejection means mounted at a second ejection station adjacent the outer surface of the second wheel for purging the mold cavities in the second set of their contents as they translate past the second ejection station.

12. The apparatus of claim 1, also including:
at least one wire mounted alongside the first wheel and the second wheel, for cutting off excess food from edges of the first wheel as said first wheel rotates, and for cutting off excess food from edges of the second wheel as said second wheel counter-rotates.

13. The apparatus of claim 1, also including:
a set of cheek plates mounted near the loading station in a position for preventing the input food from escaping from the loading station except by being compressed between a pair of the aligned mold cavities.

14. The apparatus of claim 1, wherein each of the mold cavities has a surface defining substantially half of an outer surface of a pitted prune, whereby the aligned mold cavities form the food paste into molded pieces having pitted prune shape.

15. The apparatus of claim 1, wherein each of the mold cavities has a surface defining substantially half an outer surface of a berry, whereby the aligned mold cavities form the food paste into molded pieces having berry shape.

* * * * *